United States Patent

Miyanaga

(10) Patent No.: US 7,137,462 B2
(45) Date of Patent: Nov. 21, 2006

(54) DRILL BIT

(75) Inventor: Masaaki Miyanaga, Hyogo (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 0 days.

(21) Appl. No.: 10/533,671

(22) PCT Filed: Oct. 31, 2003

(86) PCT No.: PCT/JP03/13981

§ 371 (c)(1),
(2), (4) Date: Nov. 4, 2005

(87) PCT Pub. No.: WO2004/039525

PCT Pub. Date: May 13, 2004

(65) Prior Publication Data

US 2006/0180355 A1    Aug. 17, 2006

(30) Foreign Application Priority Data

Nov. 1, 2002    (JP) .............................. 2002-319611

(51) Int. Cl.
*E21B 10/43* (2006.01)
(52) U.S. Cl. ...................... 175/398; 175/415
(58) Field of Classification Search ................ 175/415, 175/417, 418, 395, 387, 398, 400; 408/204

See application file for complete search history.

(56) References Cited

U.S. PATENT DOCUMENTS

| | | | | |
|---|---|---|---|---|
| 890,012 A | * | 6/1908 | Anderson | 175/398 |
| 897,336 A | * | 9/1908 | Anderson | 175/417 |
| 1,081,721 A | * | 12/1913 | Carr | 175/417 |
| 1,571,348 A | * | 2/1926 | Stee | 175/417 |
| 2,179,689 A | * | 11/1939 | Earnheart | 175/415 |
| 2,484,365 A | * | 10/1949 | Wilsher | 175/415 |
| 2,519,861 A | * | 8/1950 | Turner | 175/400 |
| 2,971,594 A | * | 2/1961 | Spencer | 175/400 |
| 3,521,716 A | * | 7/1970 | Fisher | 175/417 |
| 4,456,083 A | * | 6/1984 | Gozeling et al. | 175/415 |

FOREIGN PATENT DOCUMENTS

| | | |
|---|---|---|
| JP | 57-21213 A | 2/1982 |
| JP | 62-57808 A | 3/1987 |

(Continued)

OTHER PUBLICATIONS

International Search Report for International Patent Application PCT/JP03/13981 dated Feb. 2, 2004 by the Japanese Patent Office (1 page).

*Primary Examiner*—Hoang Dang
(74) *Attorney, Agent, or Firm*—Marshall, Gerstein & Borun LLP

(57) ABSTRACT

A drill bit constructed to improve a tip end of the cutting pointed portion to efficiently discharge chips from a center portion of a crush face of a drill hole to thereby improve cutting efficiency, is disclosed. A plurality of cutting blades 3a, 3b, and 3c are formed to be arranged in a circumferential direction of a cutting blade chip 3 formed by a cemented carbide block body. The cutting blades 3a, 3b, and 3c are each structured to have a cutting edge 4 formed by an edge between a face 6 and a flank 7 of the associated cutting blades. In this drill bit, a groove 8 is configured to be provided in a center portion of the tip end of the cutting blade chip in contact with tip ends of the cutting blade chip, and the tip ends of the cutting edges 4 have pointed portions.

10 Claims, 5 Drawing Sheets

FOREIGN PATENT DOCUMENTS

| | | |
|---|---|---|
| JP | 123715/1989 | 6/1991 |
| JP | 123716-1989 | 6/1991 |
| JP | HEI 3-62714 | 6/1991 |

* cited by examiner

DRILL BIT

The present application claims the benefit of priority of International Patent Application No. PCT/JP03/13981 filed on Oct. 31, 2003, which application claims priority of Japanese Patent Application No. 2002-319611 filed Nov. 1, 2002. The entire text of the priority application is incorporated herein by reference in its entirety.

TECHNICAL FIELD

The present invention relates to a drill bit constructed such that a cutting blade chip made of cemented carbide is fixedly attached to a bit body by brazing, welding, or the like. More particularly, the present invention relates to a drill bit which is suitable for use in drilling holes in concrete, stone, etc.

BACKGROUND ART

Drilling holes in concrete, stone, etc, is done by attaching a dedicated drill bit to a rotating hammer drill and by applying both an axial vibrational striking force and a rotational torque to the drill bit. In order to meet demands for high efficiency in a drilling operation, a drill bit is typically constructed such that a cutting blade chip made of cemented carbide which has high wear resistance is fixedly attached to a tip end of the cutting edge of a bit body of the drill bit by brazing, welding, etc.

The applicant has already proposed a drill bit of this type which is used exclusively for drilling holes in concrete, stone, etc, and is constructed such that a cutting blade chip fixedly attached to a lower end portion of a bit body has a plurality of cutting blades, each cutting edge is formed by an edge between a face and a flank of the cutting blades, tip ends of the cutting edges of the cutting blades are coupled at a center thereof to form a pointed shape without a chisel edge, a concave portion formed between the cutting blades is continuous with a chip discharge groove formed on an outer periphery of the bit body (for example, see Japanese Laid-Open Patent Application Publication No. 2002-178328).

Assume that the above mentioned drill bit without the chisel edge is attached to a rotating hammer drill and carries out drilling holes in a concrete, stone, etc. In a cutting operation (striking and cutting operation) carried out by applying an axial vibrational striking force to a crush face of a drill hole, i.e., by striking a tip end of the cutting edge to the crush face of the drill hole, the crush face of the drill hole may be crushed, and then a bit rotates to cut the crush face of the drill bit which has become fragile due to prior striking and cutting. In this manner, the drilling operation progresses.

In this case, the degree to which the crush face of the drill hole is crushed by striking becomes larger at a center portion of the tip end of the cutting edge of the pointed shape into which tip ends of the cutting edges are adapted to gather.

However, when the cutting operation is carried out by rotation of the bit, a cutting ability is low at the center portion of the tip end of the cutting edge because rotation track is not substantially drawn. In addition, since chips are inefficiently discharged from a center portion of the crush face of the drill hole which is conically recessed, they tend to remain there. The center portion of the cutting edges repeatedly strikes the remaining chips. This reduces cutting efficiency of striking and cutting.

Accordingly, an object of the present invention is to provide a drill bit capable of improving a tip end portion of cutting edges to reduce chips remaining in a center portion of a crush face of a drill hole to thereby improve cutting efficiency.

In order to solve the above described problem, there is provided a drill bit comprising a cutting blade chip formed by a cemented carbide block body, the cutting blade chip having a plurality of cutting blades arranged in a circumferential direction of the cutting blade chip to extend radially outward, the cutting blades being each structured to have a cutting edge formed by an edge between a face and a flank of the cutting blades, the cutting edges extending radially outward such that tip ends are positioned on a tip end portion of the cutting blade chip, wherein a groove is configured to be provided in a center portion of the cutting blade chip in contact with tip ends of the cutting edges, and the tip ends of the cutting edges have pointed portions.

In accordance with the drill bit constructed as described above, the tip ends of the cutting edges are formed in contact with the groove and have a pointed shape. Therefore, when the drill bit is attached to the rotating hammer drill and used for drilling holes in concrete, stone, etc, it strikes the crush face of the drill hole. In this case, the pointed portions at the tip ends of the cutting edges which are close to each other strike the crush face of the drill hole at the same time. For this reason, the crush face of the drill hole is also crushed to a region corresponding to the pointed portions (groove portions), and chips being generated at the crush face of the drill hole are left in the groove. In this state, when the drill bit continues to rotate, the pointed portions of the tip ends of the cutting edges draw a rotation track. In the rotation and cutting operation performed by the cutting edges, the entire cutting edges (over an overall length) entirely cut the crush face of the drill hole which has become fragile due to prior striking and cutting. In addition, the chips left in the groove after prior striking and cutting operation is discharged outside the groove without substantial resistance by the rotation of the groove. Since the chips remaining in the center portion of the crush face of the drill hole is reduced, cutting efficiency improves.

The groove may be formed to cross an axis (axis extending in a longitudinal direction of the drill bit) of the drill bit at a substantially right angle, the groove may be structured to have a face of a circular-arc shape as viewed from a side such that a width of the groove increases from a deepest point thereof toward the tip end of the cutting edge. In this structure, a circular-arc face of the groove is inclined toward the tip end of the cutting edge, and the pointed portion of the tip end of the cutting edge is formed substantially by an apex of three inclined faces including the face and the flank of the cutting blade, and the circular-arc face of the groove. This increases resistance to impact. Therefore, deformation or wear of the pointed portions of the tip ends of the cutting edges are reduced, regardless of repeated striking and cutting operation with respect to the crush face of the drill hole. As a result, cutting performance is stable. Further, since the groove has the circular-arc face, the chips easily move in the groove and are easily discharged from the groove.

While the number of the cutting blades is not specifically limited in the drill bit of the present invention, the cutting blades may be formed by three cutting blades arranged at uniform (equal) intervals in a circumferential direction thereof, the three cutting blades may be structured such that the tip end of the cutting edge of one of the three cutting blades is positioned at one end portion of the groove, and tip ends of the cutting edges of remaining cutting blades are positioned at intermediate portions of the groove, and an opposite end portion of the groove is positioned in a concave (trough) portion formed between a face and a flank of associated cutting blades. In this structure, the concave portion in which the end portion of the groove is positioned leads to the chip discharge groove formed on the outer periphery of the bit body through the concave portion formed between the cutting blades. Therefore, the chips are efficiently discharged from the groove.

The drill bit provided with the groove on the tip end side of the cutting edge is manufactured in a simple process in such a manner that the tip ends of the cutting edges are coupled to each other at the tip portion of the cutting blade chip to form the pointed portions and then the groove is formed on the tip end side of the cutting edge. As a result, a drill bit (product) which has cutting edges and pointed portions with a high finish precision and has high quality is easily manufactured with high productivity.

BEST MODE FOR CARRYING OUT THE INVENTION

Hereinafter, an embodiment of a drill bit according to the present invention will be described with reference to the drawings.

(Embodiment 1)

Figure 1:
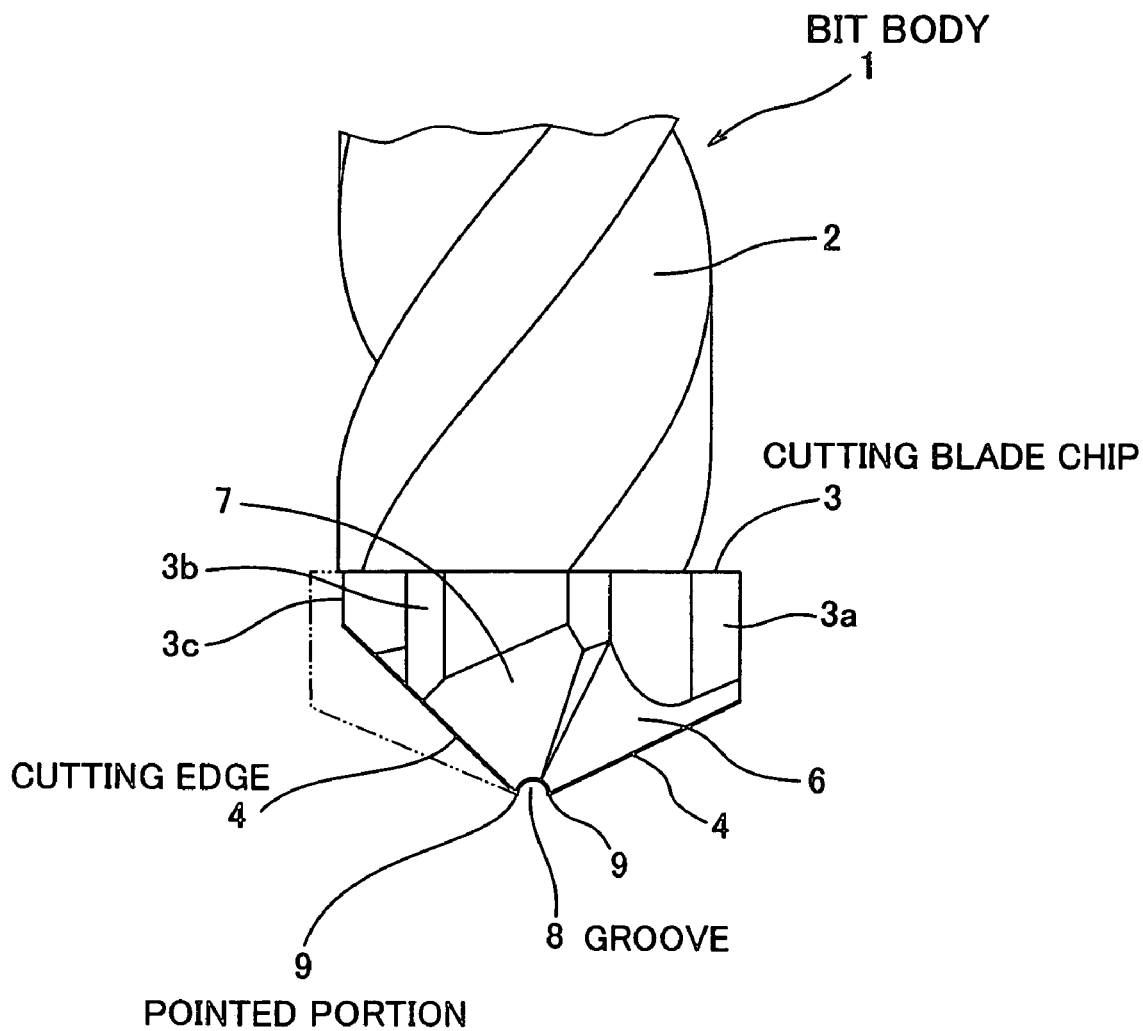
FIG. 1 is a side view of components of a drill bit according to an embodiment of the present invention, a part of which is omitted.
Figure 2:
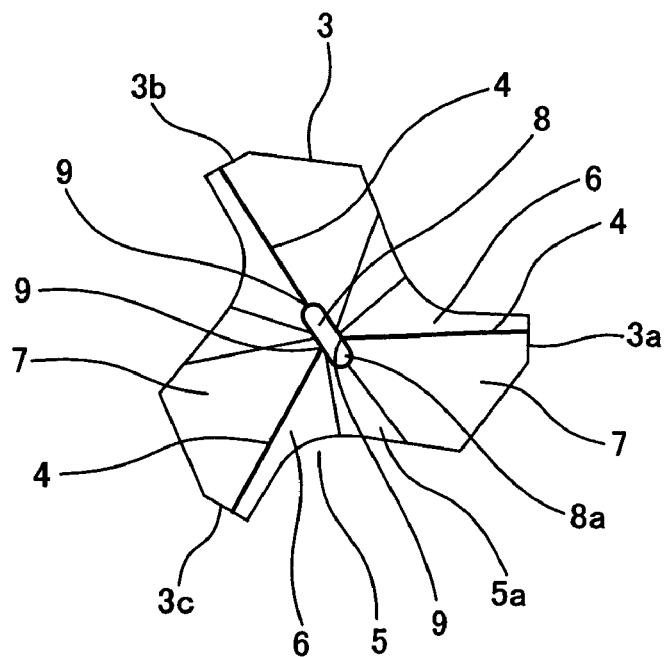
FIG. 2 is a bottom view of the drill bit of FIG. 1.

Turning now to FIGS. 1 and 2, a steel bit body 1 is shown. A shank (not shown) extends upward from the bit body 1 and is coupled to a drive shaft of a rotation hammer drill. Chip discharge grooves 2 are formed on an outer periphery of the bit body 1. A cutting blade chip 3 formed by a cemented carbide block is fixedly attached to a tip end of the bit body 1 by brazing, welding, or the like. The cutting blade chip 3 has cutting blades 3a, 3b, and 3c arranged in a circumferential direction thereof. Concave portions 5 are each formed between the cutting blades 3a and 3b, 3b and 3c, and 3c and 3a and lead to the chip discharge grooves 2 of the bit body 1. Each cutting blade 3a, 3b, or 3c has a cutting edge 4 formed by an edge between a face 6 and a flank 7 of the associated cutting blades.

In the present invention, when the cutting edge 4 is formed in each cutting blade 3a, 3b, or 3c, tip ends of the cutting edges 4 are first caused to gather to form a pointed shape without chisel edge at a tip end of the cutting edge. Then, after the cutting edges 4 are formed, a groove 8 is formed at the center portion of the tip end of the cutting edge to extend in a direction substantially perpendicular to an axial direction of the bit body 1 to form a pointed portion 9 at the tip end of each cutting edge 4.

In this embodiment, a groove face of the groove 8 is formed in a circular-arc shape As shown in FIG. 1, the groove 8 is formed to have a groove face having a width that increases from a deepest point toward the tip end of the cutting edge.

Specifically, as shown in FIG. 2, the pointed portion 9 of the tip end of the cutting edge 4 of the cutting blade 3b is positioned at one end portion of the groove 8, and the pointed portions 9 of the tip ends of the cutting edges 4 of the remaining cutting blades 3a and 3c are formed at intermediate portions of the groove 8. An opposite end portion 8a of the groove 8 is positioned in a concave (trough) portion 5a formed by the face 6 and the flank 7 between the cutting blades 3a and 3c. The concave portion 5a lead to the chip discharge groove 2 formed on the outer periphery of the bit body 1 through the concave portion 5 between the cutting blades 3a and 3c.

A basic construction of the drill bit having another construction is similar to that of the drill bit which is well known. Therefore, the well-known drill bit is replaced by this drill chip for use in drilling holes.

In accordance with the drill bit of the present invention, when each cutting edge 4 strikes the crush face of the drill hole to cause the crush face of the drill hole to be subjected to a striking and cutting action, it strikes and crushes the crush face of the drill hole. In this case, since the pointed portions 9 of the tip ends of the cutting edges 4 are close to each other and strike the crush face of the drill hole, the crush face of the drill hole is crushed in the vicinity of the pointed portions 9 to a region of the center portion of the tip end of the cutting edge corresponding to the groove 8. A part of the chips being generated at this time are left in the groove 8. In this state, when the drill bit continues to rotate, the pointed portions 9 of the tip ends of the cutting edges 4 draw a rotation track. Therefore, the cutting edges 4, including the pointed portions 9, entirely rotate and strike the crush face of the drill hole which has become fragile due to prior striking and cutting action. At this time, since the groove 8 rotates, most of the chips remaining in the groove 8 is discharged from the groove 8 into the chip discharge groove 2 through the concave portion 5a without substantial resistance by the rotation of the groove 8. As a result, the chips remaining in the crush face of the drill hole decreases, thus carrying out a smooth drilling operation.

Figure 3:
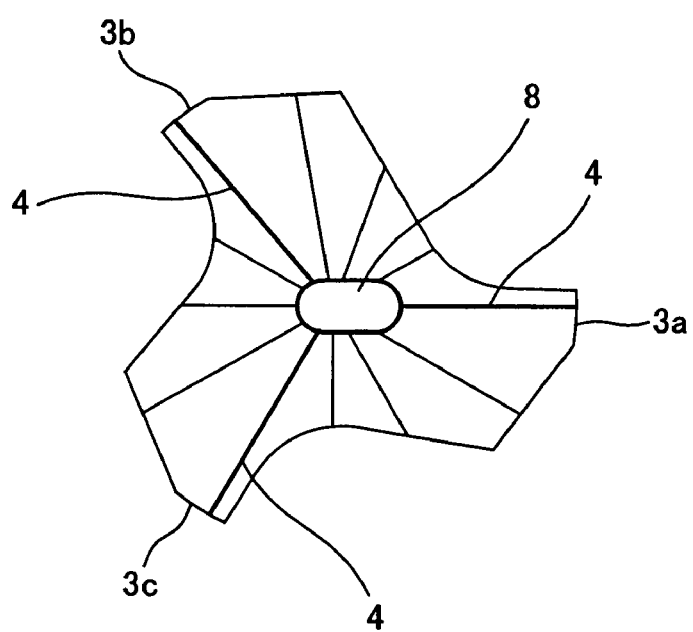
FIG. 3 is a bottom view of a drill bit according to another embodiment of the present invention, showing a structure in which cutting blades are arranged at non-uniform intervals in a circumferential direction of the drill bit.
Figure 4:
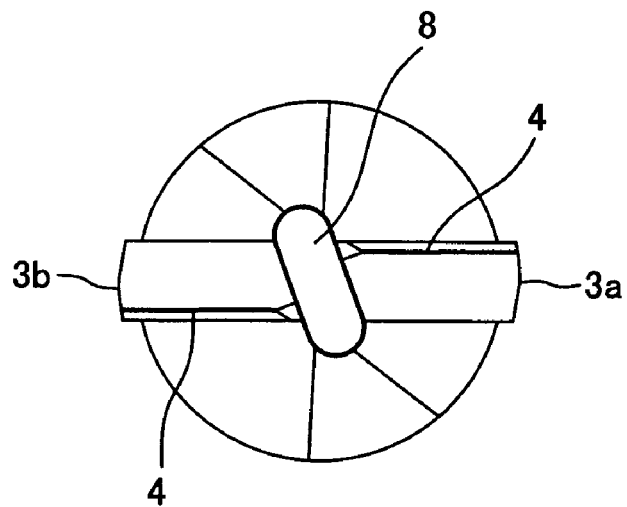
FIG. 4 is a bottom view showing a construction of a drill bit according to another embodiment of the present invention, having two cutting blades.

While the drill bit having the cutting blades 3a, 3b, and 3c arranged at uniform (equal) intervals has been described in the above embodiment, they may alternatively be arranged at non-uniform intervals as shown in FIG. 3. In further alternatives, as shown in FIG. 4, the cutting blades 3a and 3b may be arranged at two locations and at uniform or non-uniform intervals, or otherwise may be arranged at four or more locations and at uniform or non-uniform intervals, although not shown.

Figure 5:
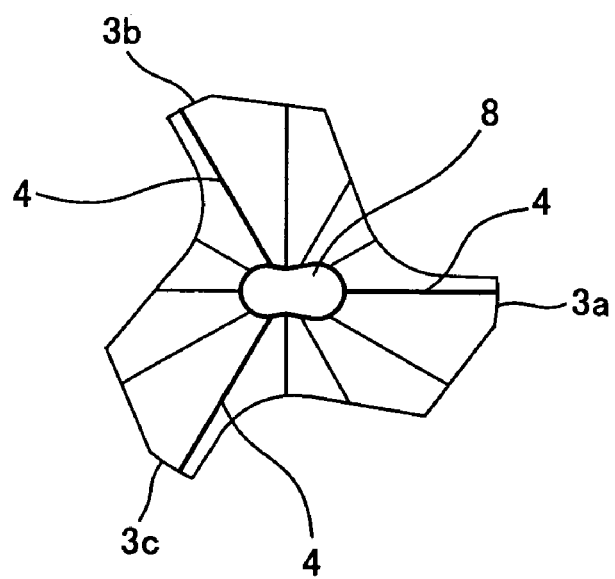
FIG. 5 is a bottom view showing a construction of a drill bit according to another embodiment of the present invention, in which a groove is dumbbell-shaped.
Figure 6:
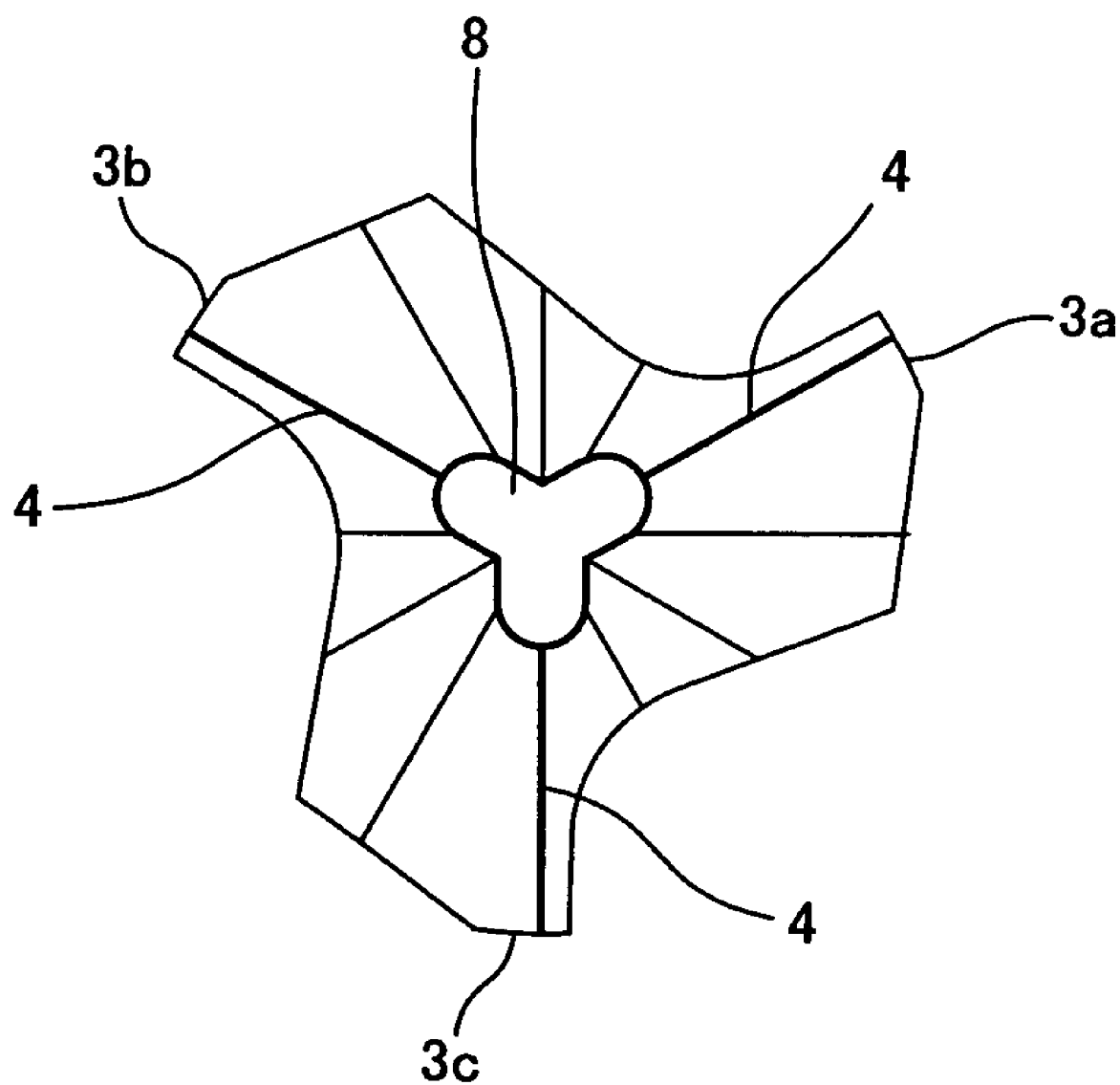
FIG. 6 is a bottom view showing a construction of a drill bit according to another embodiment of the present invention, in which the groove is trefoil-shaped.
Figure 7:
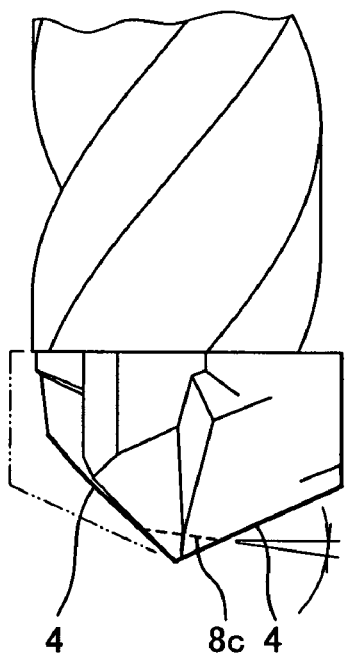
FIG. 7 is a side view of components of a drill bit according to another embodiment of the present invention, in which a bottom face of the groove is inclined in one direction.
Figure 8:
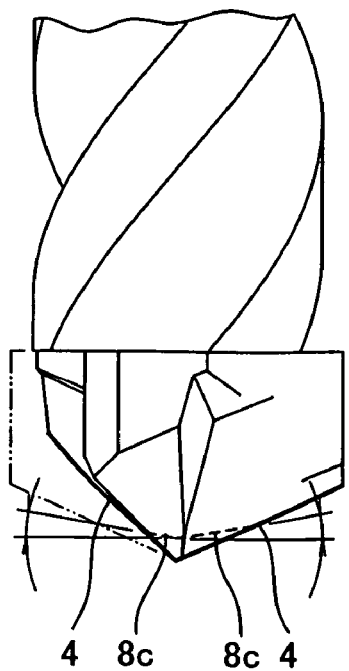
FIG. 8 is a side view of components of a drill bit according to another embodiment of the present invention, in which the bottom face of the groove is inclined in opposite directions to form a pointed shape.

The groove 8 may be configured in an elongated circle shape having semicircular portions at both ends as viewed from the bottom as shown in FIG. 2, or may be configured in a dumbbell-shape as viewed from the bottom as shown in FIG. 5. Or, as shown in FIG. 6, the groove 8 may be configured in a trefoil shape, or in other shapes. A bottom 8c of the groove 8 may be formed to extend in the direction perpendicular to the axial direction of the bit, or may be inclined as indicated by a broken line of FIG. 7. Or, as indicated by a broken line of FIG. 8, the bottom 8c of the groove 8 may be configured to be inclined in opposite directions to form a pointed portion. Further, as viewed from the bottom, the longitudinal direction of the groove 8 may conform to the longitudinal direction of the cutting edges 4, or they may form a crossing angle between them. In FIGS. 3 through 8, the same reference designators as those in FIGS. 1 and 2 denote the same or corresponding parts.

In accordance with the drill bit of the present invention, since the tip ends of the plurality of cutting edges are in contact with the groove formed at the tip portion of the tip end of the cutting edge and forms pointed portions, the crush face of the drill hole is crushed to the region corresponding to the groove in the striking and cutting operation which is adapted to cause the cutting edges to strike the crush face of the drill hole. As a result, a crushing action which is superior to that of the conventional drill bit is provided. In addition, in the cutting operation by rotation which is adapted to cause the cutting edges to strike and cut the crush face of the drill hole, the tip ends of the cutting edges also draw a rotation track. Thus, the cutting operation is effectively performed. Further, since the groove enables the chips to be efficiently discharged from the center portion of the crush face of the drill hole, the chips remaining in the crush face of the drill hole decreases. Therefore, cutting efficiency is improved. Moreover, the drill bit is manufactured in a simple process for forming the groove at the tip portion of the cutting edges. As a result, a drill bit (product) which has a tip end of the cutting edge with a high finish precision and has high quality is easily manufactured with high productivity.

INDUSTRIAL APPLICABILITY

The drill bit of the present invention is used as a drill bit suitable for use in drilling holes in concrete, stones, etc.

The invention claimed is:

1. A drill bit comprising: a cutting blade chip formed by a cemented carbide block body, the cutting blade chip having a plurality of cutting blades arranged in a circumferential direction of the cutting blade chip to extend radially outward, the cutting blades being each structured to have a cutting edge formed by an edge between a face and a flank of the cutting blades, the cutting edges extending radially outward such that tip ends are positioned on a tip end portion of the cutting blade chip,
   wherein a groove is configured to be provided in a center portion of the cutting blade chip in contact with tip ends of the cutting edges such that the groove has an elongated circle shape formed by semicircular portions as viewed in a bottom view and has a bottom, and the tip ends of the cutting edges having pointed portions.

2. The drill bit according to claim 1, wherein the groove is formed to cross an axis of the drill bit at a substantially right angle, and the groove is structured to have a face of a circular-arc shape as viewed from a side such that a width of the groove increases from a deepest point thereof toward the cutting edge tip end.

3. The drill bit according to claim 1, wherein the cutting blades are formed by thee cutting blades arranged at uniform intervals in a circumferential direction thereof, the three cutting blades are structured such that the pointed portion of the top end of the cutting edge of one of the three cutting blades is positioned at one end portion of the groove, and the pointed portions of the tip ends of the cutting edges of remaining cutting blades are positioned at intermediate portions of the goove, and
   an opposite end portion of the groove is positioned in a concave portion formed between a face and a flank of associated cutting blades.

4. The drill bit according to claim 2, wherein the cutting blades are formed by thee cutting blades arranged at uniform intervals in a circumferential direction thereof, the three cutting blades are structured such that the pointed portion of the top end of the cutting edge of one of the three cutting blades is positioned at one end portion of the groove, and the pointed portions of the tip ends of the cutting edges of remaining cutting blades are positioned at intermediate portions of the goove, and
   an opposite end portion of the groove is positioned in a concave portion formed between a face and a flank of associated cutting blades.

5. A drill bit comprising a cutting blade chip formed by a cemented carbide block body, the cutting blade chip having a plurality of cutting blades arranged in a circumferential direction of the cutting blade chip to extend radially outward, the cutting blades being each structured to have a cutting edge formed by an edge between a face and a flank of the cutting blades, the cutting edges extending radially outward such that tip ends are positioned on a tip end portion of the cutting blade chip,
   wherein a groove is configured to be provided in a center portion of the cutting blade chip in contact with tip ends of the cutting edges such that the groove has a dumbbell shape as viewed in a bottom view and has a bottom, and the tip ends of the cutting edges have pointed portions.

6. The drill bit according to claim 5, wherein the groove is formed to cross an axis of the drill bit at a substantially right angle, and the groove is structured to have a face of a circular-arc shape as viewed from a side such that a width of the groove increases from a deepest point thereof toward the cutting edge tip end.

7. The drill bit according to claim 5, wherein the cutting blades are formed by thee cutting blades arranged at uniform intervals in a circumferential direction thereof, the three cutting blades are structured such that the pointed portion of the top end of the cutting edge of one of the three cutting blades is positioned at one end portion of the groove, and the pointed portions of the tip ends of the cutting edges of remaining cutting blades are positioned at intermediate portions of the goove, and
   an opposite end portion of the groove is positioned in a concave portion formed between a face and a flank of associated cutting blades.

8. A drill bit comprising a cutting blade chip formed by a cemented carbide block body, the cutting blade chip having a plurality of cutting blades arranged in a circumferential direction of the cutting blade chip to extend radially outward, the cutting blades being each structured to have a cutting edge formed by an edge between a face and a flank of the cutting blades, the cutting edges extending radially outward such that tip ends are positioned on a tip end portion of the cutting blade chip,
   wherein a groove is configured to be provided in a center portion of the cutting blade chip in contact with tip ends of the cutting edges such that the groove has a trefoil shape as viewed in a bottom view and has a bottom, and the tip ends of the cutting edges have pointed portions.

9. The drill bit according to claim 8, wherein the groove is formed to cross an axis of the drill bit at a substantially right angle, and the groove is structured to have a face of a circular-arc shape as viewed from a side such that a width of the groove increases from a deepest point thereof toward the cutting edge tip end.

10. The drill bit according to claim 8, wherein the cutting blades are formed by thee cutting blades arranged at uniform intervals in a circumferential direction thereof, the three cutting blades are structured such that the pointed portion of the top end of the cutting edge of one of the three cutting blades is positioned at one end portion of the groove, and the pointed portions of the tip ends of the cutting edges of remaining cutting blades are positioned at intermediate portions of the goove, and an opposite end portion of the groove is positioned in a concave portion formed between a face and a flank of associated cutting blades.

* * * * *